(12) United States Patent
Würsching et al.

(10) Patent No.: US 8,475,224 B2
(45) Date of Patent: Jul. 2, 2013

(54) COMPACT FLUORESCENT LAMP AND METHOD FOR MANUFACTURING

(75) Inventors: István Würsching, Budapest (HU); László Bánkuti, Budapest (HU); Ferenc Papp, Budapest (HU); József Fülöp, Budapest (HU)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/859,688

(22) Filed: Aug. 19, 2010

(65) Prior Publication Data

US 2011/0012509 A1    Jan. 20, 2011

(51) Int. Cl.
*H01J 9/00*    (2006.01)
*H05B 33/10*    (2006.01)

(52) U.S. Cl.
USPC ............... 445/26; 445/23; 445/42; 445/43; 445/44; 313/484; 313/485; 313/489; 313/493; 313/634; 313/318.01; 313/318.02; 313/318.12

(58) Field of Classification Search
USPC ............ 313/634, 318.01, 318.12, 484, 485, 313/489, 493, 318.02; 445/23, 26, 42, 43, 445/44
See application file for complete search history.

(56) References Cited

U.S. PATENT DOCUMENTS

| | | | | |
|---|---|---|---|---|
| 2,103,047 A | * | 12/1937 | Verburg et al. | 315/308 |
| 2,476,616 A | * | 7/1949 | Morehead | 315/58 |
| 3,479,548 A | * | 11/1969 | Schlessel | 313/113 |
| 4,401,913 A | * | 8/1983 | Koza et al. | 313/25 |
| 4,417,176 A | * | 11/1983 | Kamei et al. | 315/59 |
| 4,527,089 A | * | 7/1985 | Bouchard et al. | 313/493 |
| 4,600,856 A | * | 7/1986 | Bouchard et al. | 313/25 |
| 4,620,125 A | * | 10/1986 | Keeffe et al. | 313/25 |

(Continued)

FOREIGN PATENT DOCUMENTS

| | | |
|---|---|---|
| DE | 201 16 815 U1 | 4/2002 |
| JP | 59 005554 A | 1/1984 |

OTHER PUBLICATIONS

EP 06 25 4781 European Search Report, May 22, 2012.

*Primary Examiner* — Nimeshkumar Patel
*Assistant Examiner* — Thomas A Hollweg
(74) *Attorney, Agent, or Firm* — Fay Sharpe LLP

(57) ABSTRACT

This compact fluorescent lamp includes a discharge tube arrangement with at least one discharge tube formed of glass and enclosing a discharge volume filled with a discharge gas. A ballast circuit is connected to the electrodes disposed at each end of a continuous arc path for controlling the current in the tube. A substantially spherical portion of an outer envelope encloses the tube arrangement and an elongated end portion encloses the ballast circuit. The end portion of the outer envelope is closed and sealed by a seal formed of the same material as the material of the outer envelope.

In the associated method of manufacture, the envelope is separated by cutting along a circumferential line into an upper part and a lower part, the ballast circuit introduced into the lower part and respective lead-in wires and the lead-out wires are short and need not be insulated. The ballast circuit and the discharge tube arrangement are held and supported in the outer envelope by the connecting wires and fixing means.

20 Claims, 5 Drawing Sheets

U.S. PATENT DOCUMENTS

| | | | |
|---|---|---|---|
| 5,049,785 A * | 9/1991 | Shaffer | 315/205 |
| 5,828,170 A | 10/1998 | Nishio et al. | |
| 5,834,889 A * | 11/1998 | Ge | 313/493 |
| 6,064,155 A * | 5/2000 | Maya et al. | 315/56 |
| 6,452,326 B1 * | 9/2002 | Ge et al. | 313/493 |
| 6,577,065 B2 * | 6/2003 | Kling | 315/56 |
| 6,741,013 B2 * | 5/2004 | Dakin et al. | 313/25 |
| 6,781,315 B2 * | 8/2004 | Nishio et al. | 315/56 |
| 2004/0130252 A1 * | 7/2004 | Ge et al. | 313/25 |

* cited by examiner

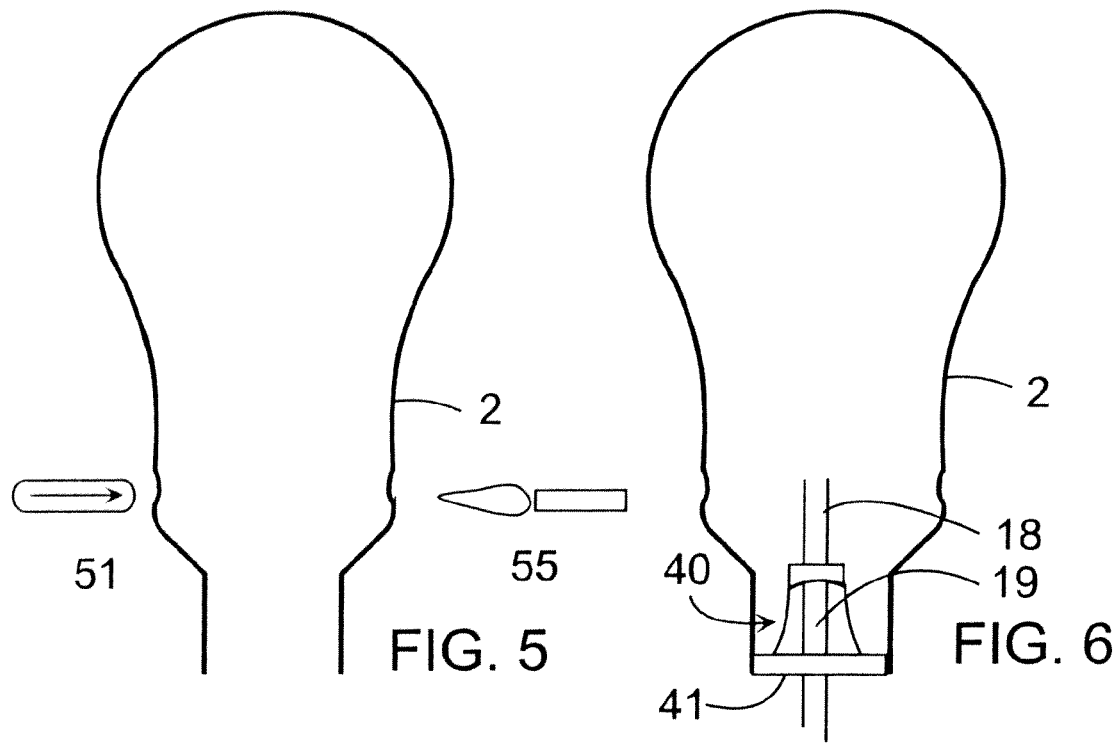
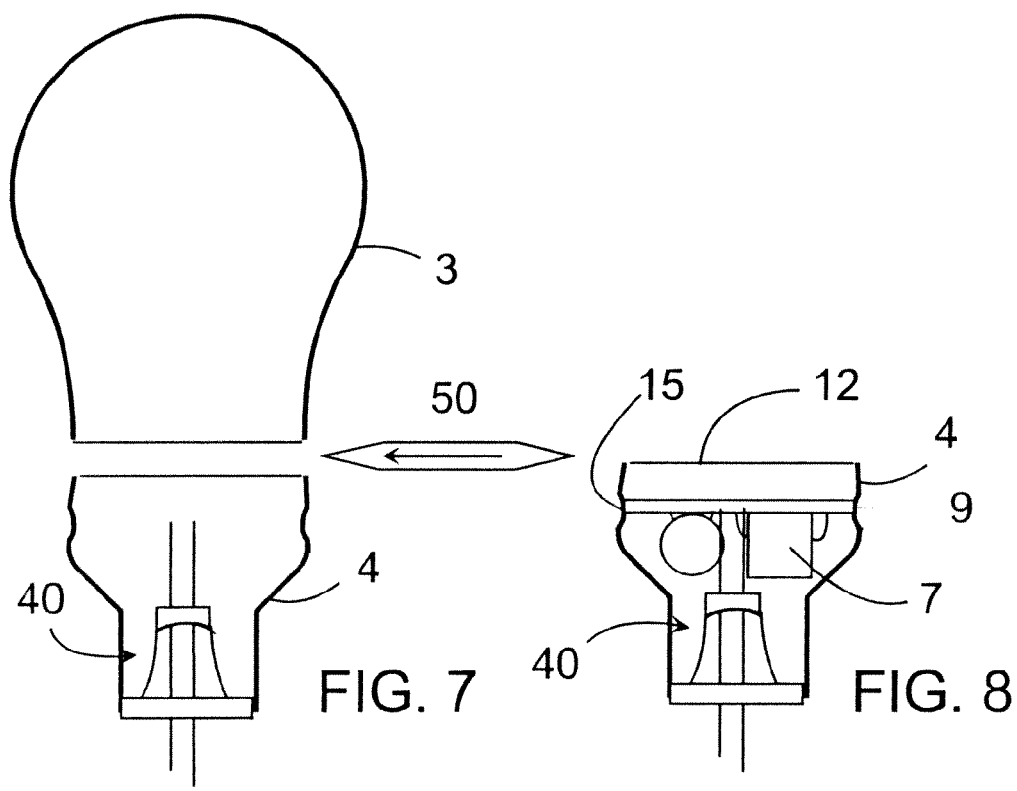

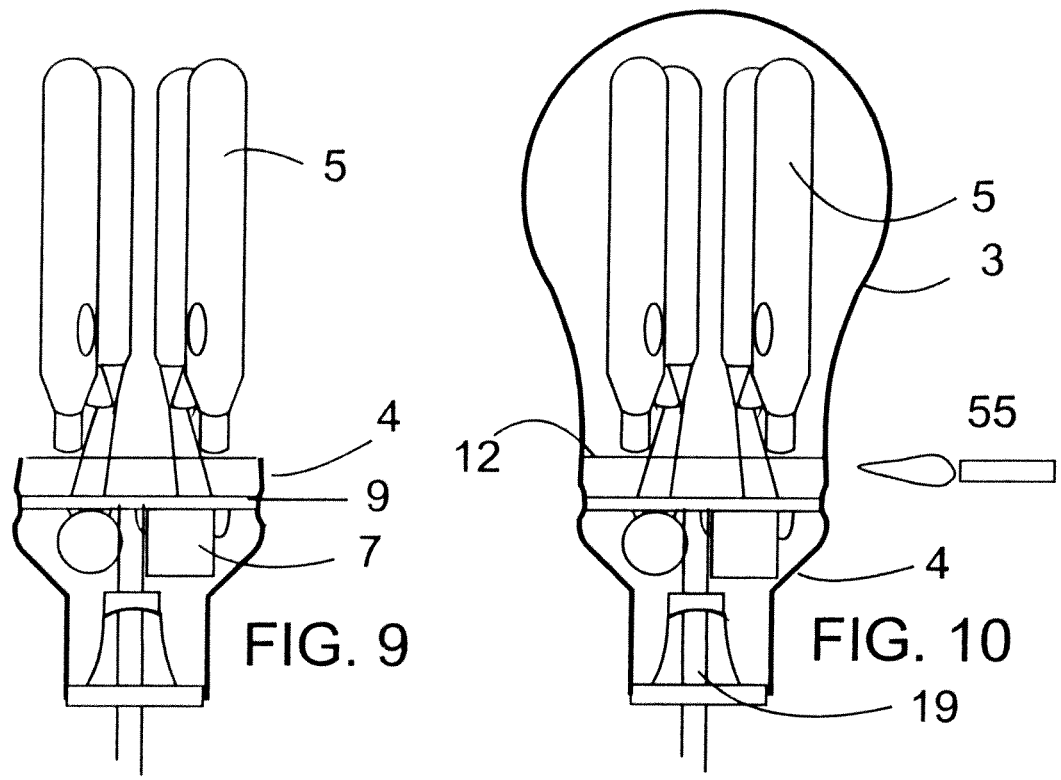
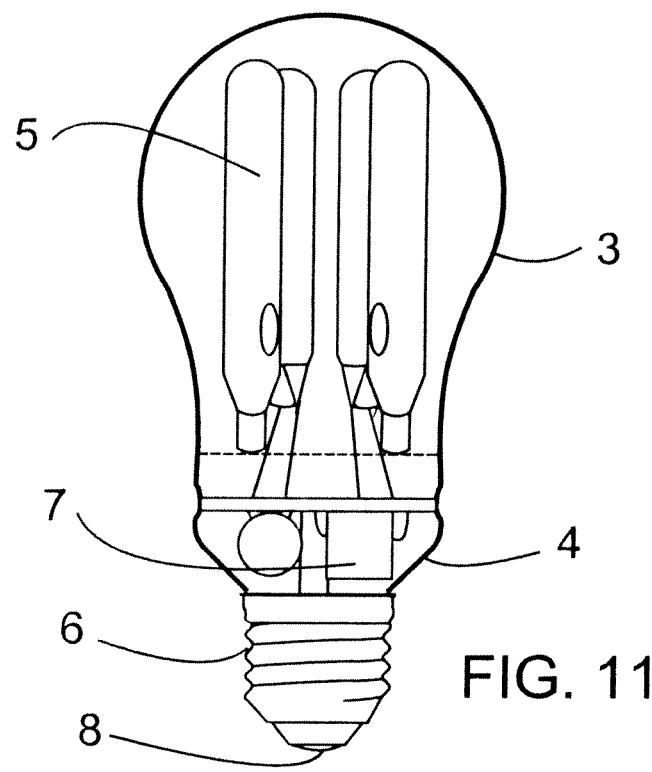

COMPACT FLUORESCENT LAMP AND METHOD FOR MANUFACTURING

FIELD OF THE INVENTION

This invention relates to compact fluorescent lamps, and more particularly to compact fluorescent lamps primarily for outdoor use. Even more specifically this invention relates to low-pressure compact fluorescent lamps, which can be used under extreme circumstances.

BACKGROUND OF THE INVENTION

The majority of known and commercially available low-pressure discharge lamps are so-called compact fluorescent lamps. These lamps are determined to replace incandescent lamps used in a wide field of industry and home applications. Main advantages of these lamps are the relatively low power consumption and a long lifetime. Disadvantageous is however their relatively high price and large length dimension. Many configurations have been proposed to solve the length dimension problem. Such solutions include the multiple tube arrangements and the coiled tube arrangements. Most of these constructions however lack any means for protecting the lamp against adverse environmental effects.

U.S. Pat. No. 4,527,089 discloses a compact fluorescent lamp comprising multiple, individual tubes mechanically formed into an assembly and inserted into an outer envelope. The individual open-ended tubes are connected to each other through an arc directing means to form a continuous arc path. The outer envelope has a cylindrical shape, is hermetically sealed and includes an arc generating and sustaining medium such as an atmosphere of mercury and argon. The hermetic seal is mainly used in order to provide a securely closed container for the arc generating and sustaining medium. In case of any damage to the outer envelope, the arc generating and sustaining medium containing mercury is set free, which is harmful to the environment.

U.S. Pat. No. 6,064,155 discloses a fluorescent lamp with an outer envelope having an external shape of an incandescent lamp on a standard Edison-type base. The discharge tube is wound in a coil around the axis of the envelope and is disposed within the outer envelope. A ballast is arranged within the outer envelope, as well. A heat shield is disposed between the lamp and the ballast to thermally isolate the lamp from the ballast, whereby heat from the lamp will not adversely affect the ballast. Although this lamp is less harmful to the environment in case of damage of the outer envelope, difficulties may arise during production due to the use of the heat shield disposed between the lamp and the ballast. The manufacturing steps of mounting the ballast circuit board on the discharge tube and connecting the electrodes of the discharge tube to the ballast circuit appear to be in conflict with each other. On one side, if the ballast circuit board is already mounted on the discharge tube, the connection of the electrodes to the ballast is encumbered. On the other side, if the electrodes of the discharge tube are already connected to the ballast circuit, the insertion of the ballast circuit board is no more possible. In order to overcome these difficulties, long and therefore insulated connecting wires have to be used. A further shortcoming of this lamp is that the outer envelope is not sealed hermetically and therefore the discharge tube arrangement is not protected against adverse influence of the atmosphere. The discharge tubes are not fixed inside the outer envelope, they are only held by the electrodes.

Accordingly, there is a need for a compact fluorescent lamp configuration with an improved protection against dust and humidity, in order to make the lamp appropriate for use under extreme circumstances as well. There is also a need for an improved heat protection, which is easy to combine with the conventional manufacturing steps and therefore compatible with mass production. It is sought to provide a compact fluorescent lamp configuration, which readily supports different types of discharge tube configurations.

SUMMARY OF THE INVENTION

In an exemplary embodiment of the present invention, there is provided a compact fluorescent lamp comprising a discharge tube arrangement with at least one discharge tube. The tube is formed of glass, encloses a discharge volume filled with a discharge gas and has a fluorescent phosphor coating disposed on the inner surface of the tube. The tube forms a continuous arc path and is provided with electrodes disposed at each end of the arc path. The lamp also comprises a ballast circuit connected to the electrodes for controlling the current in the tube and a lamp base for connecting said lamp to a power supply through a socket. The lamp is provided with an outer envelope comprising a substantially spherical portion enclosing the tube arrangement and an elongated end portion enclosing the ballast circuit. The end portion of the outer envelope is closed and sealed by a sealing means of the same material as the material of the outer envelope. The sealing means is connected to the envelope in a hermetically sealing way.

In an exemplary embodiment of another aspect of the present invention a method for manufacturing a compact fluorescent lamp is also proposed. The method comprises the following steps. An outer envelope comprising a substantially spherical portion and an elongated end portion being terminated by an open end on the base side is provided. The open end of the elongated portion of the envelope is closed and sealed with a sealing means of the same material as the material of the outer envelope to provide a hermetic seal. The sealing means also comprises power supply lead-out wires and an exhaust tube. The envelope is separated by cutting along a circumferential line in a plane substantially perpendicular to the principal axis of the envelope into two parts. An upper part receives a discharge tube arrangement with lead-in wires and a lower part is closed by the sealing means, and the base side receives a ballast circuit with connection points for the power supply lead-out wires and the lead-in wires of the discharge tube arrangement. The ballast circuit is introduced into the lower part and the respective connection points of the ballast circuit are connected to the lead-out wires. The lead-in wires of the discharge tube arrangement are connected to the respective connection points of the ballast circuit. The two separated parts of the envelope are brought into contact with each other along the separating line. The upper and lower part of the envelope are connected and sealed along the separating line. The envelope is provided with a base and the lead-out wires are connected to contact terminals of the base.

The disclosed compact fluorescent lamps ensure that the available lamp is well protected against any intrusion of dust and humidity from the outside atmosphere into the inside volume of the outer envelope. The position of the printed circuit board carrying the ballast circuit is selected as low as possible in proximity of the sealing means and the separating line is at a distance above the plane of the printed circuit board sufficient to provide appropriate thermal protection during reconnecting and sealing the two parts by welding. The geometry of the outer envelope and the selection of the position of the circumferential separation line between the upper and the lower part of the outer envelope enable the use of short and rigid power supply lead-out wires between the ballast circuit and base contact terminals, which eliminates the need for any isolation. Using the printed circuit board as suggested above, the consecutive manufacturing steps may be simplified, thereby providing better conditions for a mass production. By providing fixing means for fixing the position of the discharge tubes inside the outer envelope, a compact fluorescent lamp is made available which is more resistant to mechanical vibrations and shocks.

BRIEF DESCRIPTION OF THE DRAWINGS

The invention will now be described in detail with reference to the enclosed drawings, in which FIG. 5 is a schematic diagram of providing an outer envelope in the manufacturing of the lamp, FIG. 6 is a schematic diagram of sealing the outer envelope in the manufacturing of the lamp, FIG. 7 is a schematic diagram of separating the outer envelope in two parts in the manufacturing of the lamp, FIG. 8 is a schematic diagram of inserting and connecting the ballast circuit in the manufacturing of the lamp, FIG. 9 is a schematic diagram of inserting and connecting the discharge tube arrangement in the manufacturing of the lamp, FIG. 10 is a schematic diagram of connecting and sealing the two parts of the envelope and filling/exhausting the envelope in the manufacturing of the lamp, FIG. 11 is a schematic diagram of providing the sealed end of the envelope with a base and connection terminals in the manufacturing of the lamp.

DETAILED DESCRIPTION OF THE INVENTION

Figure 1:
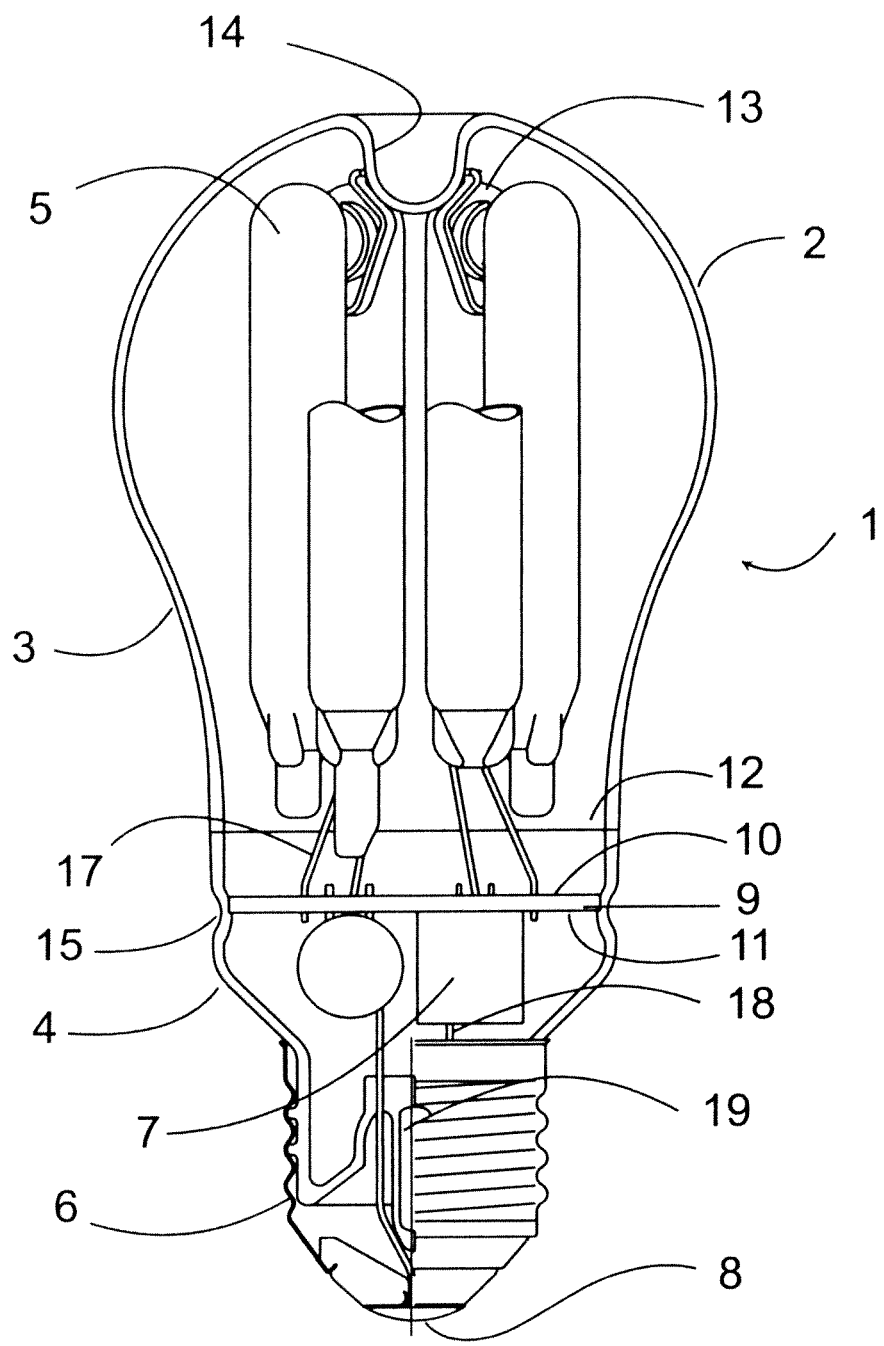
FIG. 1 is a side view, partially in cross section, showing an embodiment of the invention.

Referring now to FIG. 1, a low-pressure discharge lamp 1 is shown. The lamp is a fluorescent discharge lamp, with an outer envelope 2 enclosing a discharge tube arrangement 5 and a ballast circuit 7. The outer envelope 2 may be transparent or translucent, and may be made of glass. The outer envelope 2 has a substantially spherical portion and an elongated end portion. The outer envelope 2 is hermetically sealed at its elongated end portion and connected to a base 6. The outer envelope is cut in two parts and separated at cutting line 12 in order that the ballast circuit 7 and the discharge tube arrangement 5 can be inserted and connected inside the outer envelope 2 as described in detail below. The discharge tube arrangement 5 comprises a plurality of elongated discharge tubes. The discharge tubes are made of glass, and enclose a discharge volume filled with a discharge gas, and have a fluorescent phosphor coating disposed on the inner surface of the tubes. The ends of the tubes are sealed in a gas tight fashion. The tubes are interconnected by bridges and form a continuous arc path, at the ends of which the tubes are provided with electrodes and lead-in wires 17 connected to the electrodes. The lead-in wires 17 of the discharge tube arrangement are connected to a ballast circuit 7 for controlling the current in the discharge tubes. The ballast circuit 7 is further connected to a power supply through lead-out wires 18, which are connected to contact terminals 8 in the lamp base 6. The lamp base is configured to be adapted to a socket, which may be of any conventional or standard type normally used for incandescent lamps. The lamp base may be configured to fit in a screw-type socket or a bayonet socket.

The ballast circuit 7 is mounted on a printed circuit board 9 which has an assembling side 11 or surface facing toward said base 6, an upper side 10 or surface facing toward said discharge tube arrangement 5 and an edge portion following the shape of the outer envelope 2 to form a thermal isolating means. The edge portion of the printed circuit board 9 carrying the ballast circuit 7 has advantageously a circular boundary form according to the cross sectional configuration of the wall of the outer envelope 2 taken in cross direction to the principal axis of the lamp 1. The edge portion of the printed circuit board may be provided with slots.

The printed circuit board 9 carrying the ballast circuit 7 comprises connection points for connecting the power supply lead-out wires 18 and the lead-in wires 17 of the electrodes of the discharge tubes. The connection points for connecting the power supply lead-out wires 18 and for connecting the lead-in wires 17 of the electrodes of the discharge tubes are accessible from both the upper side 10 of the printed circuit board facing the discharge tube arrangement 5 and the assembling side 11 facing toward the base 6.

The upper side 10 surface of the printed circuit board 9 of the ballast circuit 7 may be coated or otherwise provided with a reflecting layer (not shown), which may be adapted to reflect heat or light or both. This reflecting layer must be made of an electrically non-conductive material at least on the side facing the printed circuit board 9. It may be a single layer sheet, a multiple layer sheet, or a paint of at least one layer.

Figure 2:
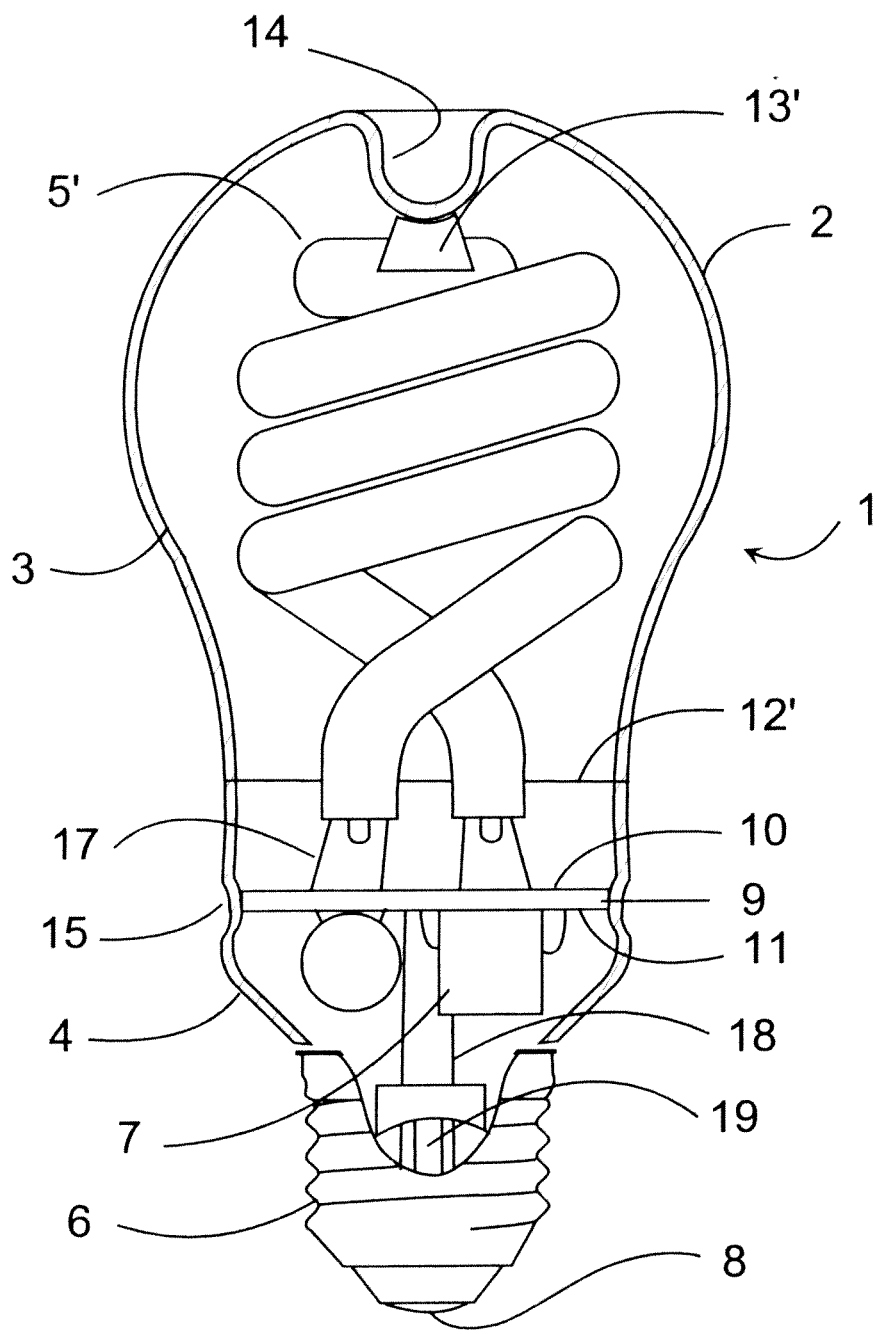
FIG. 2 is a side view, partially in cross section, showing another embodiment of the invention.

In order to provide a better holding of the printed circuit board 9 of the ballast circuit 7, the outer envelope 2 may have a circumferential groove 15 with an inside surface of the groove being in direct or indirect contact with the printed circuit board 9, as shown in FIGS. 1 and 2. To avoid tension in the envelope wall due to thermal expansion of the printed circuit board 9, a flexible sealing material may be applied between the outer envelope 2 and the edge portion of the printed circuit board 9.

As shown in FIGS. 1 and 2, the discharge tube arrangement 5 is connected to fixing means 13 for fixing the position of the discharge tube arrangement 5 inside the outer envelope 2. The fixing means 13 may be of metal, plastic or similar material sufficiently strong and flexible in order to hold the discharge tube arrangement 5 in a fixed position inside the outer envelope 2 and providing sufficient protection against mechanical vibration and shocks. The fixing means 13 may be connected to the discharge tube arrangement 5 and the outer envelope 2 in a permanent or a releasable way. A permanent connection may be established by gluing soldering, welding or the like. A releasable connection may be realized by using clips, snap-in fixtures, springs or the like.

As it can be seen in FIGS. 1 and 2, the outer envelope is provided with an arcuate recess 14 in a middle top region, where the principal axis intersects the outer envelope. The fixing means 13 are supported by the inside surface of the recessed region of the outer envelope 2 which is reinforced and stabilized in the recess region.

The difference between the embodiments shown in FIGS. 1 and 2 is in the configuration of the discharge tube arrangement. In the embodiment shown in FIG. 1, the discharge tube arrangement 5 is comprised of straight sections with a longitudinal axis substantially parallel to the principal axis of the fluorescent lamp. The neighboring discharge tubes are arranged substantially at equal distance from the principal axis of the fluorescent lamp and from each other to provide a substantially homogenous illumination. The outer envelope 2 is cut in two parts along a circumferential line in a plane substantially perpendicular to the principal axis of the envelope to form an upper part 3 for receiving the discharge tube arrangement 5 with lead-in wires and a lower part 4 for receiving a ballast circuit 7 with connection points for power supply lead-out wires and lead-in wires of the discharge tube arrangement 5. The cutting line 12 is in a position in the outer envelope where the wall of the envelope has a substantially cylindrical form. In addition, the cutting line 12 is above the plane of the printed circuit board carrying the ballast circuit at a distance sufficient for thermal protection of the ballast circuit. If the cutting line 12 is set lower, the ballast circuit may be damaged during connecting the two parts by welding. On the other side, if the cutting line 12 is set at a portion of the outer envelope where its cross-sectional diameter varies intensively along the principal axis, it may be difficult to connect the two parts with a different circumferential diameter due to loss of material during cutting and shrinking of the glass material during welding.

In the embodiment shown in FIG. 2, the discharge tube arrangement 5' is comprised of a single tube with substantially straight end sections and an intermediate portion between the end sections. The end sections are at one end of the tube arrangement 5' and in proximity to each other and the intermediate portion has a coiled configuration wound about the principal axis of the lamp 1 to provide a substantially homogenous illumination. The outer envelope 2 is cut in two parts along a circumferential line in a plane substantially perpendicular to the principal axis of the envelope to form an upper part 3 for receiving the discharge tube arrangement 5 with lead-in wires and a lower part 4 for receiving a ballast circuit 7 with connection points for the power supply lead-out wires and lead-in wires of the discharge tube arrangement 5.

Figure 3:
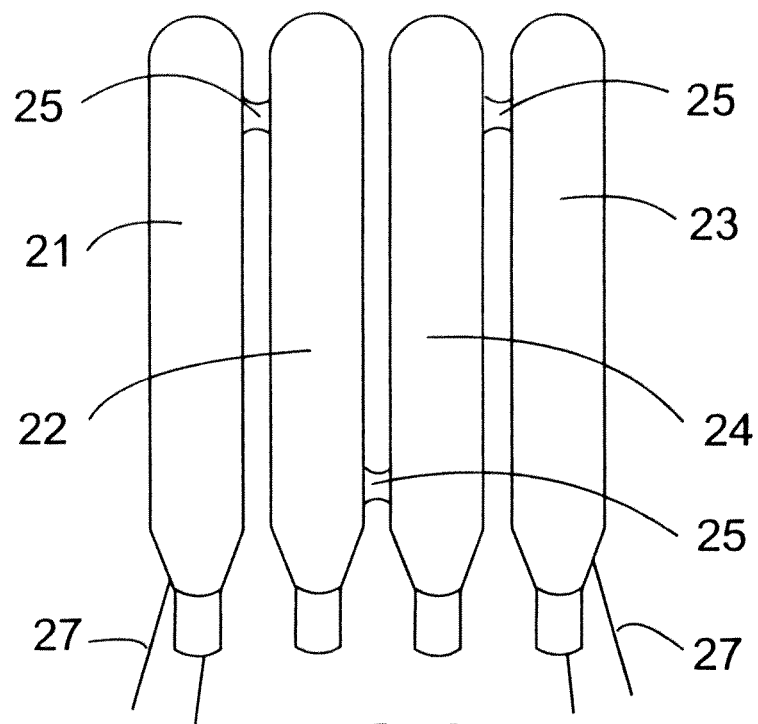
FIG. 3 is a plain spread out view of a discharge tube arrangement used in the fluorescent discharge lamp shown in FIG. 1.
Figure 4:
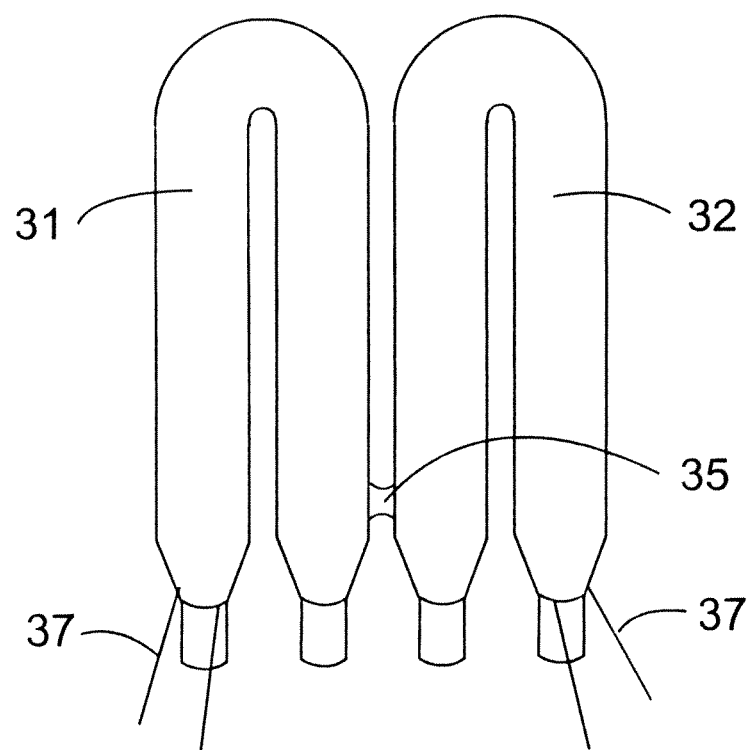
FIG. 4 is a plain spread out view of another discharge tube arrangement used in the fluorescent discharge lamp shown in FIG. 1.

FIGS. 3 and 4 illustrate two specific configurations of the discharge tube arrangement seen in FIG. 1 comprising substantially straight tube members 21, 22, 23, 24. In a first embodiment shown in FIG. 3, the discharge tube arrangement comprises four individual, elongated, substantially parallel straight discharge tube members 21-24 of substantially same length, which are interconnected by a bridge 25 to form a continuous arc path. The discharge tube arrangement is provided with electrodes and lead-in wires 27 connected to the electrodes at both ends of the arc path. Possible arrangements include also configurations with two or six individual discharge tube members depending on the required output luminous intensity. In a second embodiment shown in FIG. 4, the discharge tube arrangement comprises two individual, elongated discharge tube members 31 and 32 bent in an U-shape of substantially the same length, which are interconnected by a bridge 35 to form a continuous arc path. The discharge tube arrangement is provided with electrodes and lead-in wires 37 connected to the electrodes at both ends of the arc path. Possible arrangements include also configurations with one or three individual discharge tubes bent in an U-shape depending on the required output luminous intensity. The U-shaped discharge tube members comprise substantially parallel straight sections defining the length of the discharge tube arrangement and a curved middle section.

Each discharge tube encloses a discharge volume, which is filled with discharge gas. The discharge tubes are substantially tubular. In the shown embodiment, they are cylindrical, but other suitable cross sections may be selected as well. The discharge tubes are made of glass in the shown embodiments. It is preferred that the wall thickness of the discharge tubes should be substantially constant, mostly from a manufacturing point of view, and also to ensure an even discharge within the discharge tubes along their full length.

In order to provide a visible light, the internal surface of the discharge tubes is covered with a fluorescent phosphor layer (not shown). This phosphor layer is within the sealed discharge volume. The composition of such a phosphor layer is known per se. This phosphor layer converts UV radiation into visible light. The phosphor layer is applied to the inner surface of the discharge tubes before they are sealed.

Turning now to FIG. 5 to FIG. 11, the steps of producing a compact fluorescent lamp with an outer envelope having a sealing means of an identical material, preferably glass, with that of the outer envelope will be described in detail. In step one, as depicted in FIG. 5, an outer envelope with a substantially spherical portion and an elongated end portion is provided. The elongated end portion has an open end. In order to provide a better support for the printed circuit board carrying the ballast circuit, a circumferential groove 51 may be formed in the elongated end portion in the lower part of its wide cylindrical region. In step two, as shown in FIG. 6, the open end of the elongated end portion is closed and sealed by a sealing means 41, which is preferably a stem. The sealing means also comprises the power supply lead-out wires and an exhaust tube. As shown in FIG. 6, a stem 40 is introduced into the open end of the elongated end portion of the outer envelope 2 at the base side and sealed hermetically by a flare that is connectable in an air-tight manner to the open end of the outer envelope 2. The exhaust tube 19 extends through the flare for providing gas communication between the inside volume of the outer envelope 2 and the outside atmosphere.

In a third step, as shown in FIG. 7, the outer envelope 2 is cut in two parts with a cutting dye 50. This may preferably be done by rotating the envelope around its principal axis while bringing it into a cutting position of the cutting dye, which is also rotating itself. The separation line created in this way has a circumferential or preferably circular form in a plane substantially perpendicular to the principal axis of the envelope. The upper part 3 is removed from the lower part 4, which houses the stem 40 enclosing the power supply lead-out wires 18 and also comprising an exhaust tube 19. The position of the separation line is selected in a region where the wall of the outer envelope has a substantially cylindrical form above the plane of the printed circuit board carrying the ballast circuit at a distance sufficient to provide thermal protection for the ballast circuit. After providing the envelope or after separating the two parts of the envelope at the latest, the inside surface of the envelope may be coated by a fluorescent phosphor layer.

In a fourth step, as it is illustrated in FIG. 8, the ballast circuit 7 is inserted into the lower part 4 of the outer envelope 2 and connected electrically to the power supply lead-out wires 18. The printed circuit board carrying the ballast circuit may have previously been provided with an elastic sealing material at the edge portion in order to avoid mechanical stress due to thermal expansion. The position of the plane of the printed circuit board carrying the ballast circuit is selected as low as possible in proximity of the stem 40 in order to keep the lead-out wires 18 between the stem and the ballast circuit as short as possible. The use of short lead-out wires prevents these wires from getting short-circuited, and eliminates the need of any insulation of these wires.

In a fifth step, as it is shown in FIG. 9, the discharge tube arrangement 5 is connected electrically to the ballast circuit 7. In the event that the upper side of the printed circuit board is coated or otherwise provided with a heat or light-reflecting layer, this layer is applied to the upper side of the printed circuit board before the fifth step of assembling the discharge tube arrangement 5. Irrespective of the type of the reflecting layer, it is important that the means for connecting the lead-in wires of the electrodes remain uncovered and project above the reflecting layer. In one embodiment, the connection points for electrically connecting the discharge tube arrangement 5 to the ballast circuit 7 are provided with terminal wires. The terminal wires are connected to the connection points and extend to the assembling side of the printed circuit board of the ballast circuit toward the base. The free ends of the terminal wires are then bent upwards and lead through the slots at the circumferential portion of the printed circuit board of the ballast circuit. The electric connection between the lead-in wires and the free ends of the terminal wires is provided by wrapping the lead-in wires and the terminal wires around each other.

If a fixing means as shown in FIGS. 1 and 2 is used for fixing the position of the discharge tube arrangement inside the envelope and for absorbing shocks and vibrations of the envelope, the fixing means have to be applied to the discharge tube arrangement before or during this step. The fixing means has to be strong and flexible in order to provide an effective protection for the discharge tube arrangement inside the envelope. The material and the shape of the fixing means have to be selected so as not to decrease the luminous output of the discharge tube arrangement. Therefore a preferred material is a flexible plastic which is transparent or at least translucent. Securing the fixing elements to the discharge tubes and if required to the envelope can be carried out by a permanent or a releasable connection. A permanent connection will be established preferably by gluing at least one end of the fixing elements while the other end may be secured previously by soldering or welding as well. A releasable connection can be accomplished by using clips, snap-in fixtures, springs or the like.

In a sixth step (FIG. 10), the upper part 3 of the outer envelope is rejoined and sealed in a gas tight fashion with the lower part. In order to accomplish a gas tight connection or seal between the upper part 3 and the lower part 4 of the outer envelope, the two parts may be welded together using a heater 55, which may be a gas heater. The position of the circumferential separation line of the outer envelope has been selected in the region of the elongated portion where the wall of the envelope has a substantially cylindrical form above the plane of the printed circuit board carrying the ballast circuit at a distance sufficient to provide thermal protection of the ballast circuit. The plane of the circumferential separation line and that of the printed circuit board carrying the ballast circuit are separated from each other by a distance, which is at least 10 mm or preferably at least 20 mm. After the two parts are reconnected and sealed, the inside volume of the outer envelope may be filled with air or an inert gas at a normal or decreased atmospheric pressure through the exhaust tube 19 which is sealed afterwards as well known in the art.

Finally in a seventh step, as it is illustrated in FIG. 11, the fluorescent discharge lamp is completed with a base 6 for connecting the lamp to a conventional or standard socket of any screw-in or bayonet type. In the shown example as it can be seen in FIG. 11, the compact fluorescent lamp is provided with an Edison-type base. The lamp base may be fixed to the base side end of the elongated portion of the outer envelope in a conventional way. In order to increase mechanical strength, the base side end of the elongated portion of the outer envelope may be threaded in a similar way as the Edison-type base, which may than be screwed onto it. The electrical contacts of the power supply lead-out wires and the contact terminals 8 of the base are also created in this step.

The invention is not limited to the shown and disclosed embodiments, but other elements, improvements and variations are also within the scope of the invention. For example, it is clear for those skilled in the art that a number of other forms of the envelope 2 may be applicable, for example, the envelope may have a triangular, square, pentagonal or hexagonal cross-section. The general cross-section of the tubular discharge vessels need not be strictly circular either (as with a cylindrical discharge vessel), for example, they may be triangular or rectangular, or simply quadrangular in general. The number of discharge tube members within a lamp 1 may also vary according to size or desired power output of the lamp 1.

The invention claimed is:

1. Method for manufacturing a compact fluorescent lamp comprising the steps of:
   a) providing an outer envelope comprising a substantially spherical portion and an elongated end portion being terminated by an open end on a base side;
   b) closing and sealing the open end of the elongated portion of the envelope with a seal of the same material as the material of the outer envelope to provide a hermetic seal, the seal also comprising power supply lead-out wires and an exhaust tube;
   c) subsequently separating the envelope by cutting along a circumferential separating line along the elongated end portion in a plane substantially perpendicular to a principal axis of the envelope into an upper part for receiving a discharge tube arrangement having a maximum cross-sectional, first dimension less than a cross-sectional, second dimension of the elongated end portion of the outer envelope for receiving the discharge tube arrangement therethrough with lead-in wires and a lower part closed by the seal at the base side for receiving a ballast circuit with connection points for the power supply lead-out wires and lead-in wires of the discharge tube arrangement;
   d) next introducing the ballast circuit into the lower part and connecting the respective connection points of the ballast circuit to the power supply lead-out wires;
   e) connecting the lead-in wires of the discharge tube arrangement to the respective connection points of the ballast circuit;
   f) after the ballast circuit, lead-out wires, and lead-in wire connections have been completed, bringing the two separated parts of the envelope along the separating line into contact with each other;
   g) subsequently connecting and sealing the upper and lower part of the envelope along the separating line;
   h) providing the envelope with a base; and
   i) connecting the lead-out wires to contact terminals of the base.

2. The compact fluorescent lamp of claim 1, in which the outer envelope and the seal are made of glass.

3. The compact fluorescent lamp of claim 1, in which the seal is a stem assembly comprising
   a flare which is connectable in an air-tight manner to the open end of the envelope;
   an exhaust tube extending through the flare for providing gas communication between the inside volume of the outer envelope and the outside atmosphere; and
   power supply lead-out wires with inner ends for providing electrical connection with the ballast circuit and outer ends for providing electrical connection with contact terminals of the lamp base.

4. The compact fluorescent lamp of claim 1, in which the circumferential separation line of the outer envelope is in the region of the elongated portion where the wall of the envelope has a substantially cylindrical form, and the printed circuit board, which is received in the lower part of the envelope and positioned in a plane substantially parallel to the separation plane at a distance below the separation plane sufficient for thermal protection during connecting and sealing the two parts.

5. The compact fluorescent lamp of claim 4, in which the printed circuit board carrying the ballast circuit comprises connection points for connecting the power supply lead-out wires and the lead-in wires of the electrodes of the discharge tubes with the ballast circuit.

6. The compact fluorescent lamp of claim 1, in which the discharge tube arrangement is connected to a fixing device for fixing the position of the discharge tube arrangement inside the outer envelope.

7. The compact fluorescent lamp of claim 6, in which the fixing device is flexible in order to absorb shocks and vibrations of the envelope.

8. The compact fluorescent lamp of claim 6, in which the outer envelope is provided with an arcuate recess in a top middle region thereof, the recess being connected to the fixing device.

9. The compact fluorescent lamp of claim 1, in which the discharge tube arrangement is comprised of straight sections with a longitudinal axis substantially parallel to a principal axis of the fluorescent lamp and the neighboring sections being connected to each other in series to form a continuous arc path, and the tubes being arranged substantially at equal distance from the principal axis of the fluorescent lamp and from each other to provide a substantially homogenous illumination.

10. The compact fluorescent lamp of claim 1, in which the discharge tube arrangement is comprised of a single tube with substantially straight end sections and an intermediate portion between the end sections and the end sections being at one end of the tube arrangement and in proximity to each other and the intermediate portion having a coiled configuration wound about a principal axis of the lamp to provide a substantially homogenous illumination.

11. The compact fluorescent lamp of claim 1, in which the outer envelope is filled with air at a normal atmospheric pressure.

12. The compact fluorescent lamp of claim 1, in which the outer envelope is filled with air at a decreased pressure below atmospheric pressure.

13. The compact fluorescent lamp of claim 1, in which the outer envelope is filled with inert gas at a normal atmospheric pressure.

14. The compact fluorescent lamp of claim 1, in which the outer envelope is filled with inert gas at a decreased pressure below atmospheric pressure.

15. The method of claim 1 in which the step of connecting the lead-in wires of the discharge tube arrangement to the respective connection points of the ballast circuit further comprises the steps of
j) providing the ballast circuit with terminal wires connected to the connection points and extending to the base side;
k) bending the free ends of the terminal wires upwards and leading the bent terminal wires through slots at the circumferential portion of a printed circuit board of the ballast circuit; and
l) providing electric connection between the lead-in wires and the free ends of the terminal wires by wrapping the lead-in wires and the terminal wires around each other.

16. The method of claim 1 further comprising the step of:
m) forming an arcuate recess in a top middle region of the substantially spherical portion of the envelope; and
n) furnishing the discharge tube arrangement with a fixing device for fixing the position of the discharge tubes inside the envelope and for absorbing shocks and vibrations of the envelope before bringing the two separated parts of the envelope along the separating line into contact with each other.

17. The method of claim 1 comprising the step of filling the envelope with inert gas through the exhaust tube and sealing the exhaust tube after connecting and sealing the upper and lower part of the envelope along the separating line.

18. The method of claim 17 comprising the step of exhausting the envelope through the exhaust tube and sealing the exhaust tube after connecting and sealing the upper and lower part of the envelope along the separating line.

19. The method of claim 1 comprising the step of filling the envelope with air through the exhaust tube and sealing the exhaust tube after connecting and sealing the upper and lower part of the envelope along the separating line.

20. The method of claim 19 comprising the step of exhausting the envelope through the exhaust tube and sealing the exhaust tube after connecting and sealing the upper and lower part of the envelope along the separating line.

* * * * *